(12) United States Patent
Zhang et al.

(10) Patent No.: US 11,323,157 B2
(45) Date of Patent: May 3, 2022

(54) DOWNLINK CHANNEL ESTIMATION METHOD AND APPARATUS BASED ON SOUNDING REFERENCE SIGNAL AND COMMUNICATIONS SYSTEM

(71) Applicant: FUJITSU LIMITED, Kawasaki (JP)

(72) Inventors: Yi Zhang, Beijing (CN); Hua Zhou, Beijing (CN); Hongchao Li, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/621,649

(22) Filed: Jun. 13, 2017

(65) Prior Publication Data

US 2017/0279505 A1    Sep. 28, 2017

Related U.S. Application Data

(63) Continuation of application No. PCT/CN2014/093977, filed on Dec. 16, 2014.

(51) Int. Cl.
*H04B 7/0417* (2017.01)
*H04B 7/26* (2006.01)
(Continued)

(52) U.S. Cl.
CPC ......... *H04B 7/0421* (2013.01); *H04B 7/0617* (2013.01); *H04B 7/086* (2013.01);
(Continued)

(58) Field of Classification Search
None
See application file for complete search history.

(56) References Cited

U.S. PATENT DOCUMENTS 8,391,234 B2 * 3/2013 Nouda ................. H04L 5/0048
455/67.11
8,428,018 B2 * 4/2013 Noh ................. H04L 25/03343
370/467
(Continued)

FOREIGN PATENT DOCUMENTS

CN      102104404    * 12/2009  ........... H04B 7/0061
CN    101668338 A     3/2010
(Continued)

OTHER PUBLICATIONS

3GPP TS 36.211 version 10.0.0 Release 10, Technical Specification, Jan. 2011.*
(Continued)

*Primary Examiner* — Berhanu Tadese
(74) *Attorney, Agent, or Firm* — Myers Wolin, LLC

(57) ABSTRACT

A downlink channel estimation method and apparatus based on a sounding reference signal (SRS), and a communications system. The method includes: a base station receives a SRS sent by UE, the SRS being used for downlink channel estimation and supporting high-dimensional MU-MIMO; performing uplink channel estimation according to the SRS; and acquiring downlink channel information according to uplink channel information obtained in the uplink channel estimation. By means of embodiments of the present disclosure, downlink reference signal overheads and feedback overheads can be remarkably reduced, gain brought by large-scale antennas is obtained, and the system capacity can be further improved.

21 Claims, 7 Drawing Sheets

(51) Int. Cl.
  *H04L 25/02* (2006.01)
  *H04B 7/06* (2006.01)
  *H04B 7/08* (2006.01)
  *H04L 5/14* (2006.01)

(52) U.S. Cl.
  CPC ............ *H04B 7/26* (2013.01); *H04L 5/1446* (2013.01); *H04L 25/0204* (2013.01); *H04L 25/0224* (2013.01); *H04L 25/0228* (2013.01)

(56) References Cited

U.S. PATENT DOCUMENTS

| | | | | |
|---|---|---|---|---|
| 8,520,492 B2* | 8/2013 | Li | .................... | H04J 3/00 370/344 |
| 8,797,990 B2* | 8/2014 | Kishiyama | ........ | H04W 72/1263 370/329 |
| 9,025,429 B2* | 5/2015 | Li | .................... | H04W 72/0406 370/203 |
| 9,351,244 B2* | 5/2016 | Nordberg | .......... | H04W 52/0206 |
| 9,385,906 B2* | 7/2016 | Noh | .................... | H04L 5/0023 |
| 9,628,227 B2* | 4/2017 | Aiba | .................... | H04L 5/0007 |
| 9,667,457 B2* | 5/2017 | Yamazaki | ............ | H04L 5/0048 |
| 9,768,928 B1* | 9/2017 | Yue | .................... | H04W 4/025 |
| 10,020,922 B1* | 7/2018 | Yue | .................... | H01Q 21/00 |
| 2004/0252632 A1* | 12/2004 | Bourdoux | ............ | H04B 7/0465 370/210 |
| 2008/0232325 A1* | 9/2008 | Mehta | .................... | H04B 7/061 370/332 |
| 2010/0002649 A1* | 1/2010 | Teo | .................... | H04B 7/061 370/336 |
| 2010/0067410 A1* | 3/2010 | He | .................... | H04L 5/0048 370/480 |
| 2010/0080154 A1* | 4/2010 | Noh | .................... | H04B 7/0617 375/295 |
| 2010/0296480 A1* | 11/2010 | Nouda | ................ | H04W 72/085 370/330 |
| 2010/0309852 A1* | 12/2010 | Li | .................... | H04L 5/0048 370/328 |
| 2011/0002412 A1* | 1/2011 | Hou | .................... | H04L 27/2607 375/267 |
| 2011/0142076 A1* | 6/2011 | Ko | .................... | H04L 5/0023 370/480 |
| 2012/0008588 A1* | 1/2012 | Chung | ................ | H04L 5/0023 370/329 |
| 2012/0014349 A1* | 1/2012 | Chung | ................ | H04B 7/0693 370/329 |
| 2012/0014425 A1* | 1/2012 | Zhuang | ................ | H04W 4/025 455/67.11 |
| 2012/0147774 A1* | 6/2012 | Park | .................... | H04L 5/0035 370/252 |
| 2012/0163320 A1* | 6/2012 | Akimoto | ............... | H04L 5/0057 370/329 |
| 2012/0182857 A1* | 7/2012 | Bertrand | ............ | H04J 13/0003 370/210 |
| 2012/0281654 A1* | 11/2012 | Aiba | .................... | H04L 5/001 370/329 |
| 2012/0307700 A1* | 12/2012 | Nordberg | .............. | H04M 1/724 370/311 |
| 2013/0034070 A1* | 2/2013 | Seo | ...................... | H04L 5/0044 370/329 |
| 2013/0039305 A1* | 2/2013 | Kishiyama | ........ | H04W 72/1263 370/329 |
| 2013/0058433 A1* | 3/2013 | Na | .................... | H04L 25/03343 375/296 |
| 2013/0078913 A1* | 3/2013 | Lee | .................... | H04W 52/54 455/39 |
| 2013/0114564 A1* | 5/2013 | Ogawa | ................. | H04B 7/0689 370/330 |
| 2013/0120191 A1* | 5/2013 | Zhang | .................... | H04B 7/088 455/562.1 |
| 2013/0163544 A1* | 6/2013 | Lee | .................... | H04B 7/0626 370/329 |
| 2013/0188595 A1* | 7/2013 | Ikeda | .................. | H04L 27/2613 375/295 |
| 2013/0230123 A1* | 9/2013 | Noh | .................... | H04L 27/2627 375/295 |
| 2013/0294282 A1* | 11/2013 | Seo | .................... | H04L 5/0057 370/252 |
| 2013/0301434 A1* | 11/2013 | Krishnamurthy | .... | H04B 7/0456 370/252 |
| 2013/0301542 A1* | 11/2013 | Krishnamurthy | ... | H04W 72/042 370/328 |
| 2013/0343359 A1* | 12/2013 | Li | .................... | H04W 72/0406 370/336 |
| 2014/0003262 A1* | 1/2014 | He | .................... | H04L 1/1854 370/252 |
| 2014/0029561 A1* | 1/2014 | Kim | .................... | H04W 72/042 370/329 |
| 2014/0112260 A1* | 4/2014 | Sorrentino | .......... | H04W 52/325 370/329 |
| 2014/0133447 A1* | 5/2014 | Moulsley | .......... | H04W 72/1278 370/329 |
| 2014/0295827 A1* | 10/2014 | Tesanovic | ............. | H04W 88/04 455/552.1 |
| 2014/0349645 A1* | 11/2014 | Webb | .................... | H04L 5/0035 455/435.1 |
| 2015/0043469 A1* | 2/2015 | Kim | .................... | H04B 7/26 370/329 |
| 2015/0124688 A1* | 5/2015 | Xu | .................... | H04L 27/2634 370/312 |
| 2015/0163031 A1* | 6/2015 | Li | .................... | H04L 5/0048 370/280 |
| 2015/0163032 A1* | 6/2015 | Li | .................... | H04L 5/0007 370/336 |
| 2015/0163033 A1* | 6/2015 | Li | .................... | H04L 5/0078 370/280 |
| 2015/0163034 A1* | 6/2015 | Li | .................... | H04L 5/0053 370/280 |
| 2015/0163035 A1* | 6/2015 | Li | .................... | H04L 5/0048 370/280 |
| 2015/0163785 A1* | 6/2015 | Li | .................... | H04W 72/044 370/330 |
| 2015/0163786 A1* | 6/2015 | Li | .................... | H04L 5/026 370/330 |
| 2015/0163803 A1* | 6/2015 | Li | .................... | H04L 5/026 370/330 |
| 2015/0188683 A1* | 7/2015 | Zhang | ................ | H04B 7/0617 370/280 |
| 2015/0249526 A1* | 9/2015 | Kim | .................... | H04L 5/0048 370/329 |
| 2015/0319718 A1* | 11/2015 | Yang | .................... | H04W 72/0406 370/252 |
| 2015/0349999 A1* | 12/2015 | Kobatake | ............ | H04L 27/2675 370/343 |
| 2015/0350945 A1* | 12/2015 | Chae | .................... | H04W 24/10 370/252 |
| 2015/0358920 A1* | 12/2015 | Sorrentino | .......... | H04W 52/228 455/522 |
| 2016/0020880 A1* | 1/2016 | Li | .................... | H04L 5/04 370/280 |
| 2016/0020929 A1* | 1/2016 | Yamazaki | ................ | H04J 11/00 375/300 |
| 2016/0043842 A1* | 2/2016 | Gong | .................... | H04L 5/0048 370/329 |
| 2016/0050575 A1* | 2/2016 | Seo | .................... | H04B 17/00 370/252 |
| 2016/0050648 A1* | 2/2016 | Seo | .................... | H04W 72/0406 370/329 |
| 2016/0065338 A1* | 3/2016 | Kim | .................... | H04L 5/0048 370/330 |
| 2016/0156395 A1* | 6/2016 | Lee | .................... | H04B 7/0452 370/329 |
| 2016/0183289 A1* | 6/2016 | Qiang | .................... | H04L 1/1607 370/280 |
| 2016/0277065 A1* | 9/2016 | Xie | .................... | H04B 1/7143 |
| 2016/0315749 A1* | 10/2016 | Liang | .................... | H04L 5/0035 |
| 2017/0048039 A1* | 2/2017 | Zhao | .................... | H04L 5/0094 |
| 2017/0048802 A1* | 2/2017 | Bucknell | .................... | H04W 40/005 |

(56) References Cited

U.S. PATENT DOCUMENTS

| | | | | |
|---|---|---|---|---|
| 2017/0094673 | A1* | 3/2017 | Jitsukawa | H04W 72/082 |
| 2017/0105182 | A1* | 4/2017 | Xu | H04W 52/50 |
| 2017/0155434 | A1* | 6/2017 | Kim | H04L 5/0051 |
| 2017/0238294 | A1* | 8/2017 | Lim | H04B 7/0695 370/277 |
| 2017/0279505 | A1* | 9/2017 | Zhang | H04B 7/0421 |
| 2018/0077699 | A1* | 3/2018 | Matsumoto | H04W 72/042 |
| 2018/0175984 | A1* | 6/2018 | Yue | H01Q 1/246 |
| 2018/0191483 | A1* | 7/2018 | Yamazaki | H04L 5/14 |
| 2019/0174430 | A1* | 6/2019 | Gao | H04W 52/281 |
| 2020/0245269 | A1* | 7/2020 | Tomeba | H04L 27/0006 |
| 2020/0245356 | A1* | 7/2020 | Tomeba | H04W 72/0453 |

FOREIGN PATENT DOCUMENTS

| | | | | |
|---|---|---|---|---|
| CN | 101933359 | A | | 12/2010 |
| CN | 101969366 | A | | 2/2011 |
| CN | 102104404 | A * | | 6/2011 |
| CN | 102223726 | A | | 10/2011 |
| CN | 102474857 | A | | 5/2012 |
| CN | 102714869 | A | | 10/2012 |
| CN | 102754508 | A | | 10/2012 |
| CN | 103220101 | A | | 7/2013 |
| CN | 102104404 | B * | | 9/2014 |
| CN | WO 2016095110 | A1 * | 6/2016 | H04B 7/26 |
| EP | 2 981 038 | A1 | | 2/2016 |
| EP | 3675411 | A1 * | 7/2020 | H04B 7/0421 |
| JP | 2011-35785 | A | | 2/2011 |
| JP | 2011-71637 | A | | 4/2011 |
| JP | 2011-130438 | A | | 6/2011 |
| JP | 2011-250386 | A | | 12/2011 |
| JP | 2012-529778 | A | | 11/2012 |
| JP | 2014-116952 | A | | 6/2014 |
| WO | 2009/096387 | A1 | | 8/2009 |
| WO | 2014/156956 | A1 | | 10/2014 |
| WO | WO-2014156956 | A1 * | 10/2014 | H04B 1/0483 |
| WO | WO-2016064901 | A * | 4/2016 | H04B 7/0452 |
| WO | WO 2016064901 | A1 * | 4/2016 | H04B 7/0452 |
| WO | WO-2016095110 | A1 * | 6/2016 | H04B 7/0421 |

OTHER PUBLICATIONS

Communication pursuant to Article 94(3) EPC issued by the European Patent Office for corresponding European Patent Application No. 14 908 145.7-1219, dated Feb. 13, 2019.
Notification of Reasons for Refusal issued by the Japan Patent Office for corresponding Japanese Patent Application No. 2017-531874 dated Oct. 23, 2018, with an English translation.
Notice of Preliminary Rejection issued by the Korean Intellectual Property Office for corresponding Korean Patent Application No. 10-2017-7016665, dated Nov. 27, 2018, with an English translation.
Notification of Reasons for Refusal issued for corresponding Japanese Patent Application No. 2017-531874, dated May 22, 2018 with an English translation.
CMCC, High level view of 3D-MIMO schemes, 3GPP TSG RAN WG1 Meeting #78bis, R1-143955, Oct. 6-10, 2014.
First Notification of Office Action issued by the State Intellectual Property Office of China for corresponding Chinese Patent Application No. 201480083424.7, dated Aug. 30, 2018, with an English translation.
Search Report issued by the State Intellectual Property Office of China for corresponding Chinese Patent Application No. 201480083424.7, dated Aug. 30, 2018, with an English translation.
Communication pursuant to Article 94(3) EPC issued by the European Patent Office for corresponding European Patent Application No. 14 908 145.7, dated Jul. 24, 2019.
Notice of Preliminary Rejection issued by the Korean Intellectual Property Office for corresponding Korean Patent Application No. 10-2017-7016665, dated May 28, 2019, with an English translation.
Extended European search report with supplementary European search report and the European search opinion issued by the European Patent Office for corresponding European Patent Application No. 14908145.7, dated Jul. 5, 2018.
Dahlman et al., "Uplink Physical-Layer Processing (Chapter 11)" In: "4G LTE/LTE-Advanced for Mobile Broadband", Elsevier, XP055174616, pp. 203-246, Mar. 21, 2011.
Extended European search report with the European search report or the partial European search report/ declaration of no search and the European search opinion issued by the European Patent Office for corresponding European Patent Application No. 20155872.3, dated Jun. 4, 2020.
Communication pursuant to Article 94(3) EPC issued by the European Patent Office for corresponding European Patent Application No. 20 155 872.3-1205, dated Mar. 3, 2021.
International Search Report issued for corresponding International Patent Application No. PCT/CN2014/093977 dated Sep. 21, 2015, with an English translation.
Written Opinion of the International Searching Authority issued for corresponding International Patent Application No. PCT/CN2014/093977 dated Sep. 21, 2015, with an English translation.

* cited by examiner

0  #1          #7         #13

PUSCH        SRS

0  #1          #6         #11

PUSCH        SRS

0  #1          #7         #13

PUSCH        SRS

DOWNLINK CHANNEL ESTIMATION METHOD AND APPARATUS BASED ON SOUNDING REFERENCE SIGNAL AND COMMUNICATIONS SYSTEM

CROSS REFERENCE TO RELATED APPLICATIONS

This application is a continuation application of International Application PCT/CN2014/093977 filed on Dec. 16, 2014, the entire contents of which are incorporated herein by reference.

TECHNICAL FIELD

This disclosure relates to the field of communications technologies, and in particular to a downlink channel estimation method and apparatus based on a sounding reference signal (SRS) in a high-dimensional multiple user multiple input multiple output (MU-MIMO) system, and a communications system.

BACKGROUND

With the development of antenna technologies, a two-dimensional (2D) active antenna array may be arranged at a transmitting device, which forms three-dimensional (3D) beams through flexible weighting of antenna coefficients. The three-dimensional multi-antenna technology may improve antenna gains, reduce beam widths and reduce interference on the one hand, and on the other hand, it may improve multiplexing efficiency of the system by spatially multiplexing more users. Hence, the three-dimensional multi-antenna technology may remarkably improve the transmission efficiency and reliability of the system, and is a hot candidate technology for future mobile communications systems.

Relative to the two-dimensional multi-antenna technology, the three-dimensional multi-antenna technology has a better spatial separation characteristic, and is able to support more users to multiplex transmission. FIG. 1 is a schematic diagram of multiple user multiple input multiple output (MU-MIMO) in a 3D MIMO system. As shown in FIG. 1, a vertical dimension is added to the 3D multi-antenna system, and the number of dimensions supporting MU-MIMO in the system may further be increased.

And on the other hand, a current system, such as a frequency division duplex (FDD) system, usually adopts a reference signal to perform downlink channel estimation. That is, a base station (such as an eNB) transmits a reference signal, such as a common reference signal (CRS), or a channel state information reference signal (CSI-RS), to user equipment (UE), and the UE measures the reference signal and feeds back information on a channel, such as a rank indicator (RI)/a precoding matrix indicator (PMI)/a channel quality indicator (CQI), via an uplink channel.

It should be appreciated that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, it was found by the inventors that in a high-dimensional MU-MIMO (which may be referred to as 3D MIMO or massive MIMO) system, as the increase of the number of antennas, reference signal overhead and feedback overhead needed by a base station in acquiring downlink channel information are remarkably increased, gains brought about by large-scale antennas cannot be acquired, and the system capacity cannot be further improved.

Embodiments of this disclosure provide a downlink channel estimation method and apparatus and a communications system, in which uplink channel estimation is performed based on an SRS supporting high-dimensional MIMO transmitted by UE, and downlink channel information is acquired by using channel reciprocity, thereby downlink reference signal overhead and feedback overhead are remarkably saved.

According to a first aspect of the embodiments of this disclosure, there is provided a downlink channel estimation method based on a sounding reference signal, including:

receiving, by a base station, an SRS transmitted by UE, the SRS being used for downlink channel estimation and supporting high-dimensional MU-MIMO;

performing uplink channel estimation according to the SRS; and acquiring downlink channel information according to uplink channel information obtained through the uplink channel estimation.

According to a second aspect of the embodiments of this disclosure, there is provided a downlink channel estimation apparatus based on an SRS, including:

a reference signal receiving unit configured to receive an SRS transmitted by UE, the SRS being used for downlink channel estimation and supporting high-dimensional MU-MIMO;

an uplink channel estimating unit configured to perform uplink channel estimation according to the SRS; and a downlink channel information acquiring unit configured to acquire downlink channel information according to uplink channel information obtained through the uplink channel estimation.

According to a third aspect of the embodiments of this disclosure, there is provided a communications system, including:

a base station configured to receive an SRS transmitted by UE, perform uplink channel estimation according to the SRS, and acquire downlink channel information according to uplink channel information obtained through the uplink channel estimation; and UE configured to transmit the SRS to the base station; wherein the SRS is used for downlink channel estimation and supports high-dimensional MU-MIMO.

According to another aspect of the embodiments of this disclosure, there is provided a computer readable program code, which, when executed in a base station, will cause a computer unit to carry out the downlink channel estimation method based on a sounding reference signal as described above in the base station.

According to a further aspect of the embodiments of this disclosure, there is provided a computer readable medium, including a computer readable program code, which will cause a computer unit to carry out the downlink channel estimation method based on a sounding reference signal as described above in a base station.

Advantages of the embodiments of this disclosure exists in that a base station performs uplink channel estimation based on an SRS supporting high-dimensional MU-MIMO transmitted by UE, and acquires downlink channel information by using channel reciprocity. Thereby downlink reference signal overhead and feedback overhead are remarkably saved, gains brought about by large-scale antennas are acquired, and the system capacity is further improved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of this disclosure. To facilitate illustrating and describing some parts of the disclosure, corresponding portions of the drawings may be exaggerated or reduced.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

Figure 1:
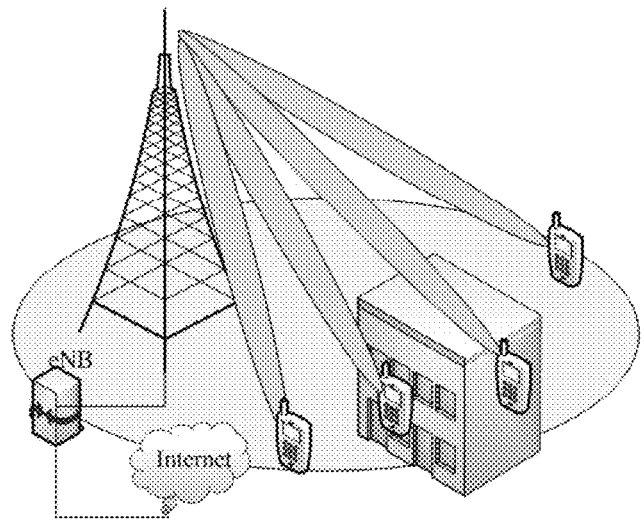
FIG. 1 is a schematic diagram of MU-MIMO in a 3D MIMO system.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Currently, an SRS is mainly used for measurement of an uplink channel, and for supporting uplink scheduling of UE. A time position of a cell SRS subframe may be determined via a high-layer configuration period and a transmission offset. Table 1 shows SRS subframe configuration in an FDD system, and Table 2 shows SRS subframe configuration in a time division duplex (TDD) system.

TABLE 1

| srs-SubframeConfig | Binary | Configuration period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | Reserved | Reserved |

TABLE 2

| srs-SubframeConfig | Binary | Configuration period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |

TABLE 2-continued

| srs-SubframeConfig | Binary | Configuration period $T_{SFC}$ (subframes) | Transmission offset $\Delta_{SFC}$ (subframes) |
|---|---|---|---|
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | Reserved | Reserved |
| 15 | 1111 | Reserved | Reserved |

Furthermore, a transmission time of the UE may be determined by using a subframe period and an offset. Table 3 shows a UE-specific SRS periodicity $T_{SRS}$ and subframe offset configuration $T_{offset}$ triggering type 0 in an FDD system, and Table 4 shows a UE-specific SRS periodicity $T_{SRS}$ and subframe offset configuration $T_{offset}$ triggering type 0 in a TDD system.

TABLE 3

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | Reserved | Reserved |

TABLE 4

| SRS Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | Reserved | reserved |

A physical layer configures each cell with eight types of different SRS bandwidth configuration and configures each piece of UE with four bandwidth options by using high-layer signaling, and completes indication of a UE SRS bandwidth via a two-stage structure. Table 5 gives all possible SRS bandwidth configuration and bandwidth options, i.e. $m_{SRS,b}$ and $N_b$, where, b=0, 1, 2, 3, when an uplink bandwidth is 40-60 RB (40<$N_{RB}^{UL}$≤60).

TABLE 5

| SRS bandwidth configuration $C_{SRS}$ | SRS bandwidth $B_{SRS}=0$ | | SRS bandwidth $B_{SRS}=1$ | | SRS bandwidth $B_{SRS}=2$ | | SRS bandwidth $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

Furthermore, a position of a starting point of a frequency is determined by radio resource control (RRC) signaling. An SRS sequence is a Zadoff-Chu sequence, and is determined jointly by the number of groups of sequences of physical uplink control channel (PUCCH), the number of groups of base sequences and cyclic shift identifiers.

In mapping of a sequence to a physical resource, an SRS adopts a frequency interval of two subcarriers, forming a "comb" frequency domain structure. SRSs of different UE are multiplexed by frequency division multiplexing (FDM) (i.e. different comb values), time division multiplexing (TDM) (i.e. different subframes) and code division multiplexing (CDM); the CDM is carried out by cyclic shifts (at most eight) of the base sequences.

An SRS is transmitted in a last symbol of a normal uplink subframe. In a TDD frame structure, in a case where a length of the UpPTS is of two symbols, the two symbols may both be configured for the SRS transmission. When the UpPTS has an single-carrier frequency division multiple access (SC-FDMA) symbol, the symbol may be used for the SRS transmission; and when the UpPTS has two SC-FDMA symbols, they may both be used for the SRS transmission, and may be allocated for the same UE.

When channel quality is relatively worse, use of a narrow-band SRS may improve channel quality of a receiving device, hence, a hopping method needs to be used to acquire channel information on more bands. At present, a periodic SRS supports hopping transmission, and an aperiodic SRS does not support hopping transmission.

On the other hand, in a current system, such as a time division duplex (TDD) system, uplink and downlink channels have reciprocity to some extent, and a base station may acquire information on an uplink channel by measuring an SRS transmitted by UE, and then obtain information on a downlink channel by using a calibration technology.

In this embodiment, in the 3D MIMO or massive MIMO system, information on a downlink channel may be acquired based on an SRS supporting high-dimensional MU-MIMO and by using channel reciprocity, which may remarkably save downlink reference signal overhead and feedback overhead, acquire gains brought about by large-scale antennas, and further improve the system capacity. Embodiments of this disclosure shall be described below in detail.

Embodiment 1

Figure 2:
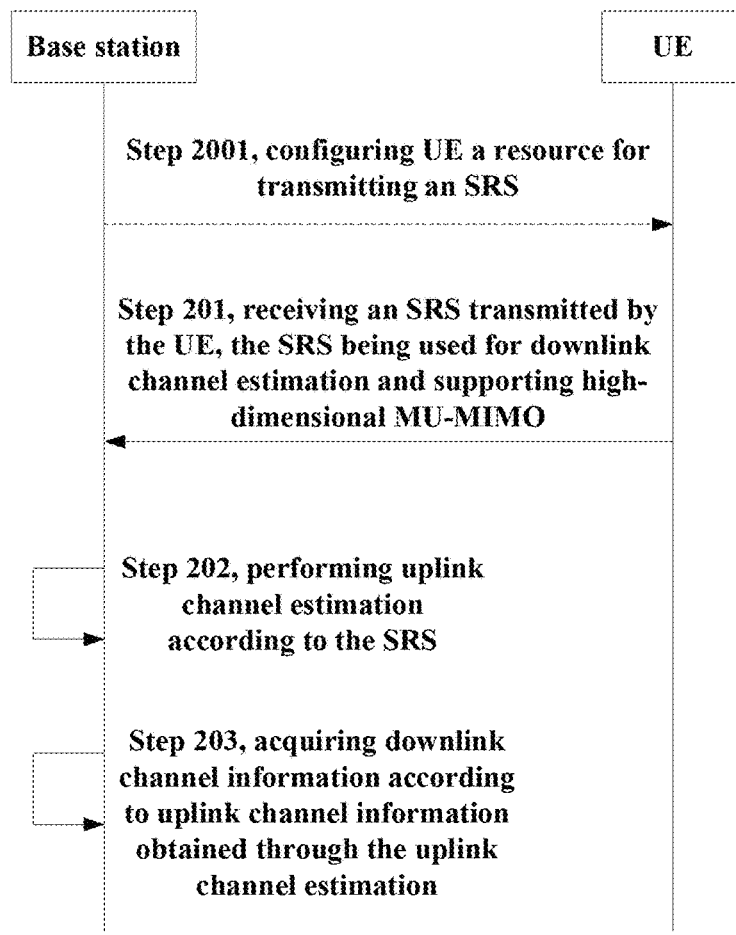
FIG. 2 is a flowchart of the downlink channel estimation method based on an SRS of an embodiment of this disclosure.

An embodiment of this disclosure provides a downlink channel estimation method based on an SRS. FIG. 2 is a flowchart of the downlink channel estimation method based on an SRS of the embodiment of this disclosure. As shown in FIG. 2, the method includes:

step 201: a base station receives an SRS transmitted by UE, the SRS being used for downlink channel estimation and supporting high-dimensional MU-MIMO;

step 202: the base station performs uplink channel estimation according to the SRS; and step 203: the base station acquires downlink channel information according to uplink channel information obtained through the uplink channel estimation.

In this embodiment, this method is applicable to a high-dimensional MU-MIMO system; in which, following defects exist in the SRS: the number of pieces of UE supported by the high-dimensional MU-MIMO system will be remarkably increased, which will result in insufficiency of a capacity of the SRS; in configuring a wideband SRS for edge UE, transmission power is relatively large, and a case of limited power will occur in the UE; and if the number of antennas for transmission at the UE side is different from that of antennas for reception at the UE side, use of uplink and downlink reciprocity will be affected.

Furthermore, in a large-scale MIMO system, following characteristics will be presented in a channel:

(1) in performing beamforming transmission, a time-varying characteristic of the channel is relatively small; this is because as increase of the number of antennas, a spatial resolution of the channel will be increased; and if the UE moves at a relatively large speed, a spatial direction from a base station to the UE varies relatively fast, which needs the UE to feed back at a relatively large speed, resulting in very large feedback overhead; otherwise, a problem of robustness will occur in the transmission; hence, time variation of the channel in a typical application scenario of large-scale antennas is small;

(2) as increase of the number of antennas, sizes of the antennas are limited in use; in order to guarantee the sizes of the antennas, large-scale antennas are generally applied at a higher band, such as 5 GHz; at this band, a wavelength is relatively small, the number of scatters near the UE will be increased, and when the number of antennas is relatively large, a frequency selective characteristic of the channel will become relatively stable; and on the other hand, identical system bandwidths become transmission of a relatively narrow band at a high carrier frequency; hence, a frequency selective characteristic of the system will be relatively weakened; and (3) as increase of the number of antennas, a spatial resolution of the channel will be increased, and information on a spatial orientation of the channel will become almost quasi-orthogonal.

In order to solve the above problems, the embodiments of this disclosure propose an enhancement scheme, and use an SRS supporting high-dimensional MU-MIMO; in which, the SRS is used for downlink channel estimation. The SRS of the embodiments of this disclosure may be deemed as enhancing an existing SRS, may be deemed as a new type of SRS, and may be referred to as an SRS of type 2.

As shown in FIG. 2, the method may further include:

Step 2001: the base station configures the UE a resource for transmitting the SRS.

For example, the base station may transmit UE-specific first signaling and/or cell-specific second signaling to the UE; and the first signaling contains SRS configuration information on the UE, and the second signaling contains SRS configuration information on the cell.

The SRS configuration information on the cell may be as described in Embodiment 2 below, and a configuration signaling of the resource for transmitting the SRS (the second signaling) may include a time domain subframe periodicity, offset and used orthogonal frequency division multiplexing (OFDM) symbol(s); however, this disclosure is not limited thereto.

For each piece of UE, embodiments 2-7 describe possible resources for transmitting SRSs, and a part of the resources may be used for transmitting the SRSs, each piece of configuration signaling of the resource for transmitting the SRSs (the first signaling) may include a time domain subframe periodicity, offset and used OFDM symbol(s), and a frequency carrier starting point indicator, the number of combs and physical resource blocks, as well as cyclic offset of an SRS sequence; however, this disclosure is not limited thereto.

In this embodiment, the base station may perform uplink channel estimation based on an SRS transmitted by the UE, and any existing uplink channel estimation method may be used. Then information on the downlink channel may be obtained by using channel reciprocity (such as by means of calibration technology). Hence, downlink reference signal overheads and feedback overheads can be remarkably reduced, gain brought by large-scale antennas is obtained, and the system capacity can be further improved.

Embodiment 2

On the basis of Embodiment 1, the embodiment of this disclosure further describes the SRS. In this embodiment, increasing available resources for SRSs is an effective method for solving a problem that an SRS capacity and power are limited. New resources may be used for transmitting SRSs of increased UE, and SRSs may also be transmitted in more time domain resources for UE with limited power, so as to lower its transmission power, and solve the problem of limited power.

In this embodiment, in addition to the resources for transmitting SRSs in the standards, new resources are used for transmitting SRSs. Taken into account that uplink transmission uses single-carrier FDMA, the whole symbols are used for transmitting the SRSs. In order to keep a unified design of FDD and TDD, the following possible OFDM symbols may be used for SRS transmission. In an LTE system, in a normal cyclic prefix (CP) subframe, symbols 3 and 10 are used for transmitting demodulation reference signals (DM-RSs), symbols 2 and 11 are possibly used for transmitting ACK/NACK, and symbols 1 and 12 are possibly used for RI transmission. In an extended subframe, the similarly specified resources are used for transmitting DM-RSs, ACK/NACK and RIs. When new SRS resources are added, it needs to take into account that these resources should be avoided, so as to reduce influence on legacy UE.

In an implementation, the SRSs may be configured in a last OFDM symbol of a subframe, and a first or last OFDM symbol of a first slot of the subframe.

Figure 3:
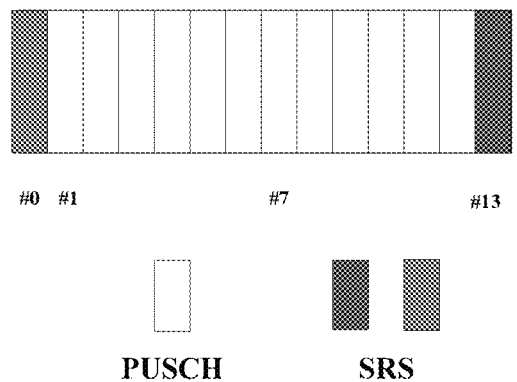
FIG. 3 is a schematic diagram of a normal subframe transmitting SRSs of an embodiment of this disclosure.

FIG. 3 is a schematic diagram of a normal subframe (normal CP subframe) transmitting SRSs of the embodiment of this disclosure. As shown in FIG. 3, the SRSs are configured in a first OFDM symbol (#0) of a first slot of the subframe, and a last OFDM symbol (#13) of the subframe.

Figure 4:
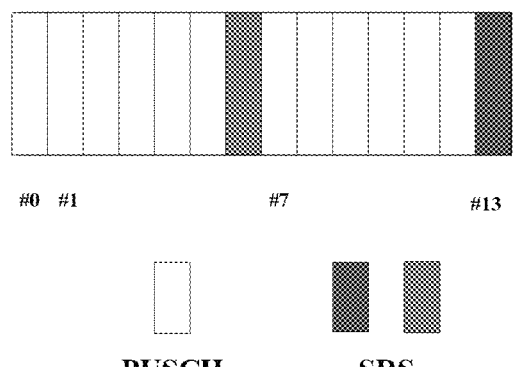
FIG. 4 is another schematic diagram of the normal subframe transmitting the SRSs of the embodiment of this disclosure.

FIG. 4 is another schematic diagram of the normal subframe (normal CP subframe) transmitting the SRSs of the embodiment of this disclosure. As shown in FIG. 4, the SRSs are configured in a last OFDM symbol (#6) of the first slot of the subframe, and a last OFDM symbol (#13) of the subframe.

Figure 5:
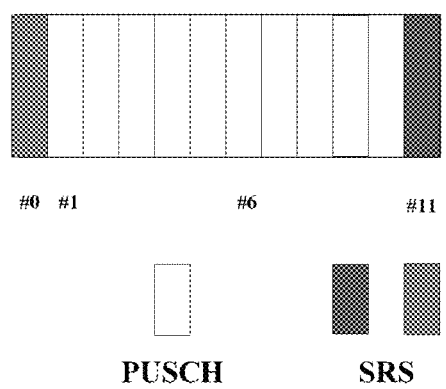
FIG. 5 is a schematic diagram of an extended subframe transmitting SRSs of the embodiment of this disclosure.

FIG. 5 is a schematic diagram of an extended subframe (extended CP subframe) transmitting SRSs of the embodiment of this disclosure. As shown in FIG. 5, the SRSs are configured in the first OFDM symbol (#0) of the first slot of the subframe, and a last OFDM symbol (#11) of the subframe.

Figure 6:
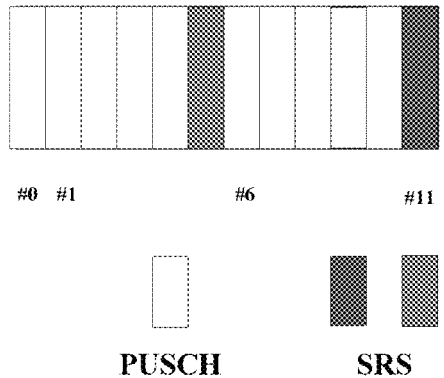
FIG. 6 is another schematic diagram of the extended subframe transmitting the SRSs of the embodiment of this disclosure.

FIG. 6 is another schematic diagram of the extended subframe (extended CP subframe) transmitting the SRSs of the embodiment of this disclosure. As shown in FIG. 6, the SRSs are configured in a last OFDM symbol (#5) of the first slot of the subframe, and the last OFDM symbol (#11) of the subframe.

In this implementation, the SRSs are transmitted in the first or the last OFDM symbol of the first slot, which may avoid DM-RSs, RIs and ACK/NACK of uplink control information, and at the same time, relatively good channel estimation quality may be guaranteed, and may be used for using a function of automatic gain adjustment.

In another implementation, the SRSs may be configured in last two OFDM symbols of a subframe.

Figure 7:
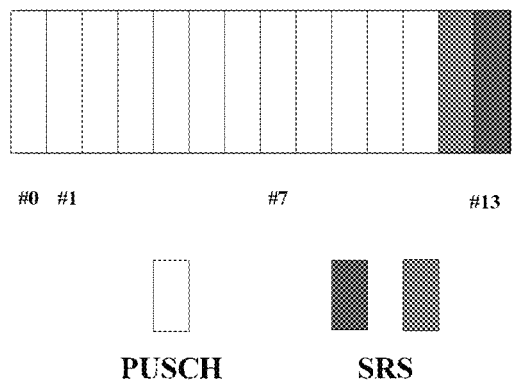
FIG. 7 is a schematic diagram of a normal subframe transmitting SRSs of the embodiment of this disclosure.

FIG. 7 is a schematic diagram of a normal subframe transmitting SRSs of the embodiment of this disclosure. As shown in FIG. 7, the SRSs are configured in last OFDM symbol but one (#12) of the subframe, and the last OFDM symbol (#13) of the subframe.

Figure 8:
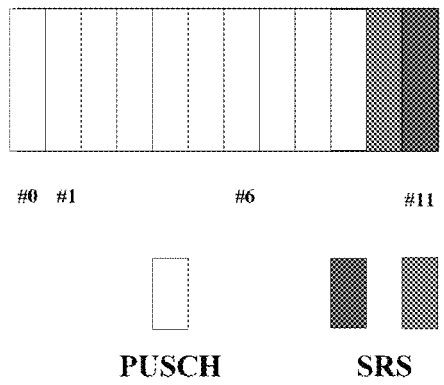
FIG. 8 is a schematic diagram of an extended subframe transmitting SRSs of the embodiment of this disclosure.

FIG. 8 is a schematic diagram of an extended subframe transmitting SRSs of the embodiment of this disclosure. As shown in FIG. 8, the SRSs are configured in last OFDM symbol but one (#10) of the subframe, and the last OFDM symbol (#11) of the subframe.

In this implementation, the SRSs are configured in the last two OFDM symbols of the subframe, which may be adapted to perform orthogonal cover code (OCC) operations, and may also use a repeated transmission manner.

In another implementation, the SRSs may be configured in a last OFDM symbol of a subframe, and the resources for transmitting the DM-RSs are used for transmitting the SRSs.

For example, in a case of no data transmission (for example, the system has no data transmission in some resources), two OFDM symbols transmitting DM-RSs in a subframe are used for transmitting the SRSs; or in a case of low-speed transmission (for example, in a cell scenario, UE transmits data at a speed lower than a predetermined threshold), an OFDM symbol used for transmitting DM-RSs in a subframe is used for transmitting the SRSs; that is, if a resource for transmitting DM-RSs still transmits DM-RSs for data demodulation, another resource for transmitting DM-RSs may be used for transmitting the SRSs.

Figure 9:
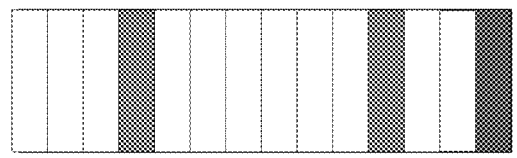
FIG. 9 is a schematic diagram of a normal subframe transmitting SRSs of the embodiment of this disclosure.
Figure 9:

FIG. 9 is a schematic diagram of a normal subframe transmitting SRSs of the embodiment of this disclosure. As shown in FIG. 9, the SRSs are configured in a fourth OFDM symbol (#3), an eleventh OFDM symbol (#10) and a last OFDM symbol (#13) of the subframe; in which, the fourth and the eleventh OFDM symbols are originally used for transmitting DM-RSs.

Figure 10:
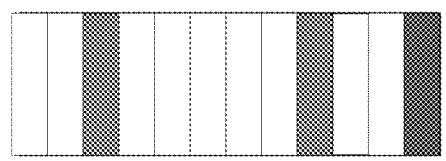
FIG. 10 is a schematic diagram of an extended subframe transmitting SRSs of the embodiment of this disclosure.
Figure 10:

FIG. 10 is a schematic diagram of an extended subframe transmitting SRSs of the embodiment of this disclosure. As shown in FIG. 10, the SRSs are configured in a third OFDM symbol (#2), a ninth OFDM symbol (#8) and a last OFDM symbol (#11) of the subframe.

In another implementation, the SRSs may be configured in a last OFDM symbol of a subframe, and the resources for transmitting device to device (D2D) synchronization signals are used for transmitting the SRSs.

For example, a second and third OFDM symbols of a first slot, or a fifth and sixth OFDM symbols of a second slot, in a normal subframe, are used for transmitting the SRSs; or a first and second OFDM symbols of a first slot, or a fourth and fifth OFDM symbols of a second slot, in an extended subframe, are used for transmitting the SRSs.

Figure 11:
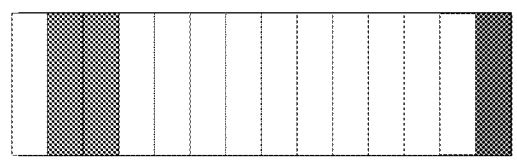
FIG. 11 is a schematic diagram of a normal subframe transmitting SRSs of the embodiment of this disclosure.
Figure 11:

FIG. 11 is a schematic diagram of a normal subframe transmitting SRSs of the embodiment of this disclosure. As shown in FIG. 11, the SRSs are configured in a second (#1) and third (#2) OFDM symbols of a first slot of the subframe, and a last OFDM symbol (#13) of the subframe.

Figure 12:
FIG. 12 is another schematic diagram of the normal subframe transmitting the SRSs of the embodiment of this disclosure.
Figure 12:

FIG. 12 is another schematic diagram of the normal subframe transmitting the SRSs of the embodiment of this disclosure. As shown in FIG. 12, the SRSs are configured in a fifth (#11) and sixth (#12) OFDM symbols of a second slot of the subframe, and a last OFDM symbol (#13) of the subframe.

Figure 13:
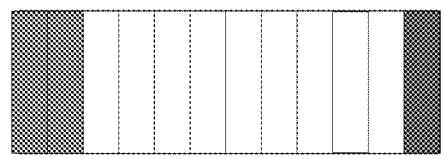
FIG. 13 is a schematic diagram of an extended subframe transmitting SRSs of the embodiment of this disclosure.
Figure 13:

FIG. 13 is a schematic diagram of an extended subframe transmitting SRSs of the embodiment of this disclosure. As shown in FIG. 13, the SRSs are configured in a first (#0) and second (#1) OFDM symbols of a first slot of the subframe, and a last OFDM symbol (#11) of the subframe.

Figure 14:
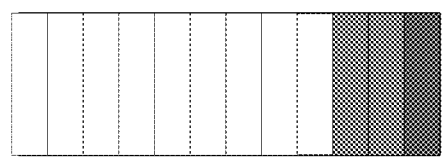
FIG. 14 is another schematic diagram of the extended subframe transmitting the SRSs of the embodiment of this disclosure.
Figure 14:

FIG. 14 is another schematic diagram of the extended subframe transmitting the SRSs of the embodiment of this disclosure. As shown in FIG. 14, the SRSs are configured in a fourth (#9) and fifth (#10) OFDM symbols of a second slot of the subframe, and a last OFDM symbol (#11) of the subframe.

In this implementation, the SRSs may be configured in the resources transmitting D2D synchronization signals. If D2D transmission of UE and uplink transmission of other UE are multiplex together, special symbols may be aligned to reduce mutual interference. And on the other hand, advantages of design for the D2D synchronization signals may be reused, for example, automatic gain adjustment and synchronization tracking may be used.

It can be seen from the above embodiment that a base station performs uplink channel estimation based on an SRS supporting high-dimensional MU-MIMO transmitted by UE, and acquires downlink channel information by using channel reciprocity, thereby downlink reference signal overhead and feedback overhead are remarkably saved, gains brought about by large-scale antennas may be acquired, and the system capacity may be further improved.

Furthermore, use of new resources may increase transmission of SRSs, and may also transmit SRSs in more time domain resources for UE with limited power, so as to solve the problem of limited power.

Embodiment 3

On the basis of Embodiment 1, the embodiment of this disclosure further describes the SRS. In this embodiment, a comb interval characteristic of the SRS may be enlarged according to a feature that a channel frequency selective characteristic becomes small. In the existing standards, a subcarrier frequency interval (i.e. a comb value) is 2.

In this embodiment, a subcarrier frequency interval of the SRS in the frequency domain is greater than 2, such as increasing the interval to be 4. Hence, the number of pieces of UE multiplexed in identical resource blocks by using different comb values is increased to be 4. That is, using six subcarriers in some resource blocks to transmit SRSs by one piece of UE in an existing system may be changed into using three subcarriers in some resource blocks to transmit SRSs.

According to a characteristic that the number of existing sounding resource blocks is 4, a length of a shortest SRS sequence is 12. Hence, the SRS sequence will not be too short, and will not affect an interference characteristic of different pieces of UE in CDM multiplexing.

It can be seen from the above embodiment that increase of the comb interval characteristic of the SRS may support more pieces of UE.

Embodiment 4

On the basis of Embodiment 1, the embodiment of this disclosure further describes the SRS. In this embodiment, a density of SRS sampling may be reduced according to a feature that a channel frequency selective characteristic becomes small. In this embodiment, resource blocks transmitting SRSs are reduced, that is, the SRSs are only configured in a part of resource blocks.

On the premise of a previous tree SRS structure, in resource blocks to which each sampling width corresponds, the number of resource blocks transmitting the SRSs may be lowered regularly. For example, for a 10M uplink bandwidth system of 50 RBs, when a cell is configured with SRS bandwidth configuration 0 and a UE is configured with SRS bandwidth indicator 0, the UE may transmit wideband SRSs in 48 RBs, and a case of limited power is prone to occur for edge UE.

In addition to changing the SRS bandwidth indicator configured for UE, the number of PRBs transmitting the SRSs may further be lowered according to a channel characteristic; in which, for a certain piece of UE, each predetermined number of resource blocks of the SRSs is configured alternately. For example, some pieces of UE transmits the SRSs in PRB of an odd number, or some pieces of UE transmits the SRSs in PRB of an even number, or the PRBs are further divided by a certain integral multiple.

In this embodiment, configuration information configured in the resource blocks may be indicated via high-layer signaling, or may be defined in a standard. For example, for the PRBs transmitting the SRSs, particularly divided granularities may be indicated via high-layer signaling, or may be defined in a standard.

It can be seen from the above embodiment that decrease of the density of the SRS sampling may support more pieces of UE.

Embodiment 5

On the basis of Embodiment 1, the embodiment of this disclosure further describes the SRS. In this embodiment, taking a characteristic that a channel changes slowly into account, SRSs used for measurement of downlink channel reciprocity may adopt relatively low sampling rates. In this embodiment, the sampling rates of the SRSs are 10 milliseconds and more.

For example, the sampling rates of the SRSs are 10 milliseconds, 20 milliseconds, 40 milliseconds, 80 milliseconds, 160 milliseconds, 320 milliseconds; however, this disclosure is not limited thereto, and a particular sampling rate may be determined according to an actual situation.

Table 6 shows a case of a UE-specific SRS periodicity $T_{SRS}$ and subframe offset configuration $T_{offset}$, which may be applicable to an FDD system and a TDD system.

TABLE 6

| SRS Configuration Index $I_{SRS}$ | SRS Periodicity $T_{SRS}$ (ms) | SRS Subframe Offset $T_{offset}$ |
| --- | --- | --- |
| 0-9 | 10 | $I_{SRS}$ |
| 10-29 | 20 | $I_{SRS}$-10 |
| 30-69 | 40 | $I_{SRS}$-30 |

TABLE 6-continued

| SRS Configuration Index $I_{SRS}$ | SRS Periodicity $T_{SRS}$ (ms) | SRS Subframe Offset $T_{offset}$ |
| --- | --- | --- |
| 70-149 | 80 | $I_{SRS}$-70 |
| 150-309 | 160 | $I_{SRS}$-150 |
| 310-629 | 320 | $I_{SRS}$-310 |
| 630-1023 | Reserved | Reserved |

It should be appreciated that Table 6 only schematically shows the case of SRS sampling rates of the embodiment of this disclosure; however, this disclosure is not limited thereto, and particular contents may be determined according to an actual situation.

Furthermore, a particular numeral value of a sampling rate may be indicated via SRS configuration applied by the reciprocity, and the indication may also include two parameters, periodicity and offset.

It can be seen from the above embodiment that use of relatively low sampling rates of the SRS may support more pieces of UE.

Embodiment 6

On the basis of Embodiment 1, the embodiment of this disclosure further describes the SRS. In this embodiment, in order to lower mutual interference between SRSs, SRSs of different cells may be coordinated.

In this embodiment, available time frequency resources of the SRSs may be divided into two sets, for one of the sets, it may be commonly used by all cells, and for the other set, it may be shared by different cells. That is, if one of the coordinated cells obtains an opportunity of transmission, other cells do not use this SRS resource, or use this SRS resource at relatively low power.

In this embodiment, a base station may transmit signaling for coordinating sounding reference signals of different cells (which may be referred to as third signaling), so that when a cell transmits a sounding reference signal, other cells do not use a resource to which the sounding reference signal corresponds, or use the resource at relatively low power. When the coordinated cells are located between different base stations, the signaling needs to be transmitted between the base stations. And at the same time, the base stations need also to notify the UE of the SRS resource coordination result.

For example, the resource to which the sounding reference signal corresponds may include one of the following pieces of information or a combination thereof: information on a subframe, OFDM symbol information, comb number information, frequency interval information, resource block information, power information, and information on cyclic offset of an SRS sequence, used by the sounding reference signal; however, this disclosure is not limited thereto.

For example, for a base station, it needs to inform other base stations to mute or transmit signals at low power at a corresponding position for transmitting the SRSs. And at the same time, the base station notifies all UE to mute or transmit signals at low power at time frequency positions corresponding to the SRSs.

It can be seen from the above embodiment that coordinating SRSs of different cells may reduce mutual interference between the SRSs.

Embodiment 7

On the basis of Embodiment 1, the embodiment of this disclosure further describes the SRS. In this embodiment, in order to overcome an effect of unequal numbers of antennas of the UE for transmission and reception on channel reciprocity, the base station needs to know whether the UE has an ability to transmit and receive information by using the same numbers of antennas, and this ability may be reported via UE ability signaling.

In this embodiment, the base station may receive the UE ability signaling reported by the UE. The UE ability signaling may include information on the number of antennas and/or information on an ability of the UE, the information on an ability of the UE being used to indicate whether the UE has an ability to transmit and receive information by using the same numbers of antennas. The information on the number of antennas may be information on the number of receiving antennas; however, this disclosure is not limited thereto.

When the base station knows that the UE does not have such an ability, it cannot use such type of SRSs for performing downlink channel estimation.

And when the base station knows that the UE has such an ability, the base station may configure the UE via specific signaling to transmit SRSs at corresponding transmitting antennas. Resources defined in the standards may be used to transmit the SRSs, or newly-added resources may be used to transmit the SRSs. The UE transmits the SRSs according to the configuration by the base station, or the UE transmits the SRSs according to defined actions and the base station may receive the SRSs according to such a definition.

In a manner, the SRSs may be cycled by the UE in the time domain resources and transmitted. For example, actions of the UE may be defined in the standards, and the base station may adopt a corresponding receiving method after receiving the UE ability signaling. For example, for a 2Tx/4Rx antenna system, 2Tx may be cycled for transmission of the SRSs in the time domain resources, that is, the SRSs are transmitted at different 2Tx antennas at different times. In order to ensure achievement of the antenna cycle, a symbol time for transmitting the SRSs must satisfy a time of antenna switch, such as at an interval of one or two OFDM symbols.

In another manner, the base station may configure the UE with multiple (two or more) sets of SRSs, so that the UE transmits the multiple sets of SRSs by using different antenna groups. Resources for transmitting the multiple sets of SRSs are divided in the time domain, such as using resources of different OFDM symbols or subframes to transmit the multiple sets of SRSs, respectively, thereby achieving switch of transmission of different groups of antennas. In order to ensure achievement of the antenna cycle, a time interval for transmitting the multiple sets of SRSs must satisfy a time of antenna switch, such as at an interval of one or two OFDM symbols.

It can be seen from the above embodiment that by reporting the UE ability, the effect of unequal numbers of antennas of the UE for transmission and reception on channel reciprocity may be overcome.

Embodiment 8

An embodiment of this disclosure provides a downlink channel estimation apparatus based on an SRS, which is configured in a base station. The embodiment of this disclosure corresponds to the downlink channel estimation method based on an SRS described in embodiments 1-7, with identical contents being not going to be described herein any further.

Figure 15:
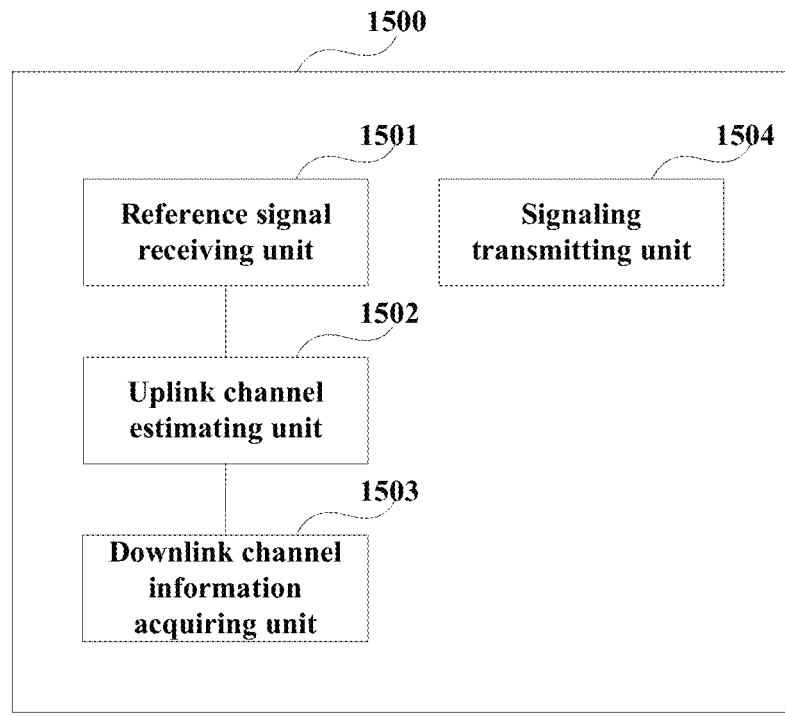
FIG. 15 is a schematic diagram of the downlink channel estimation apparatus based on an SRS of an embodiment of this disclosure.

FIG. 15 is a schematic diagram of the downlink channel estimation apparatus based on an SRS of an embodiment of this disclosure. As shown in FIG. 15, the apparatus 1500 includes:

a reference signal receiving unit 1501 configured to receive an SRS transmitted by UE, the SRS being used for downlink channel estimation and supporting high-dimensional MU-MIMO;

an uplink channel estimating unit 1502 configured to perform uplink channel estimation according to the SRS; and a downlink channel information acquiring unit 1503 configured to acquire downlink channel information according to uplink channel information obtained through the uplink channel estimation.

In this embodiment, particular contents of resources for transmitting the SRS are as described in embodiments 1-7, and for one piece of UE, a part of the resources may be used.

As shown in FIG. 15, the apparatus 1500 may further include:

a signaling transmitting unit 1504 configured to transmit UE-specific first signaling and/or cell-specific second signaling to the UE; wherein the first signaling contains SRS configuration information for the UE, and the second signaling contains SRS configuration information for the cell.

This embodiment further provides a base station, which is configured with the downlink channel estimation apparatus 1500 based on an SRS as described above.

Figure 16:
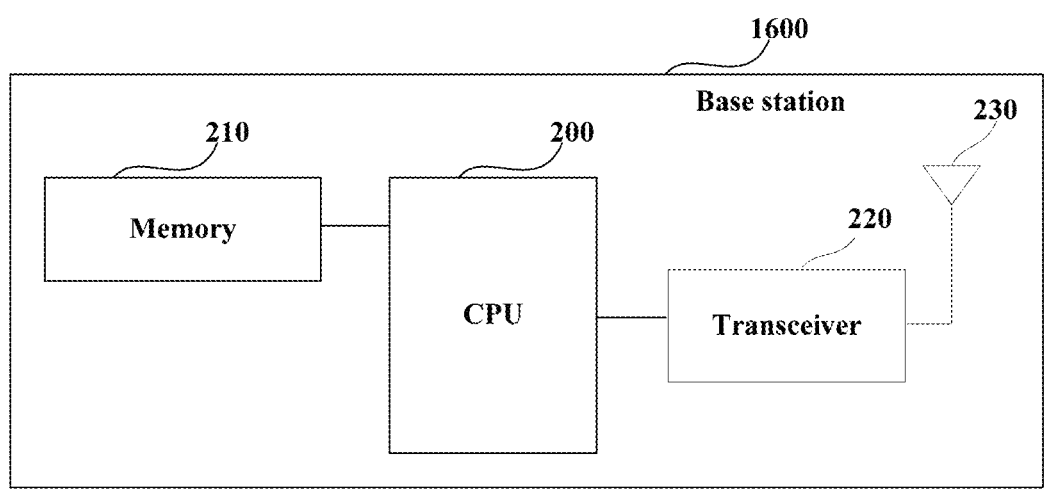
FIG. 16 is a schematic diagram of a structure of a base station of an embodiment of this disclosure.

FIG. 16 is a schematic diagram of a structure of the base station of the embodiment of this disclosure. As shown in FIG. 16, the base station 1600 may include a central processing unit (CPU) 200 and a memory 210, the memory 210 being coupled to the central processing unit 200. The memory 210 may store various data, and furthermore, it may store a program for information processing, and execute the program under control of the central processing unit 200, so as to receive various information transmitted by the UE, and transmit request information to the UE.

The central processing unit 200 may be configured to carry out the functions of the downlink channel estimation apparatus 1500. The base station 1600 may carry out the downlink channel estimation method described in embodiments 1-7.

Furthermore, as shown in FIG. 16, the base station 1600 may include a transceiver 220, and an antenna 230, etc. Functions of the above components are similar to those in the relevant art, and shall not be described herein any further. It should be appreciated that the base station 1600 does not necessarily include all the parts shown in FIG. 16, and furthermore, the base station 1600 may include parts not shown in FIG. 16, and the relevant art may be referred to.

It can be seen from the above embodiment that the base station performs uplink channel estimation based on an SRS supporting high-dimensional MU-MIMO transmitted by UE, and acquires downlink channel information by using channel reciprocity, thereby downlink reference signal overhead and feedback overhead can be remarkably reduced, gains brought about by large-scale antennas can be acquired, and the system capacity can be further improved.

Embodiment 9

Figure 17:
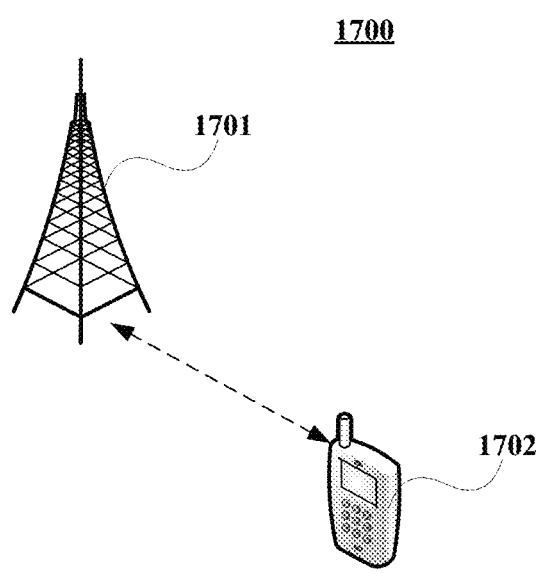
FIG. 17 is a schematic diagram of a structure of the communications system of an embodiment of this disclosure.

An embodiment of this disclosure provides a communications system. FIG. 17 is a schematic diagram of a structure of the communications system of the embodiment of this disclosure. As shown in FIG. 17, the communications system 1700 includes:

a base station 1701 configured to receive an SRS transmitted by UE, perform uplink channel estimation according to the SRS, and acquire downlink channel information according to uplink channel information obtained through the uplink channel estimation; and UE 1702 configured to transmit the SRS to the base station, the SRS being used for downlink channel estimation and supports high-dimensional MU-MIMO.

In this embodiment, particular contents of resources for transmitting the SRS are as described in embodiments 2-7.

An embodiment of the present disclosure provides a computer readable program code, which, when executed in a base station, will cause a computer unit to carry out the downlink channel estimation method based on an SRS described in embodiments 1-7 in the base station.

An embodiment of the present disclosure provides a computer readable medium, including a computer readable program code, which will cause a computer unit to carry out the downlink channel estimation method based on an SRS described in embodiments 1-7 in a base station.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communication combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A downlink channel estimation method based on a sounding reference signal (SRS), comprising:
    transmitting to User Equipment (UE) a first signal including SRS configuration information; and
    receiving, by a base station, an SRS transmitted by the UE,
    wherein the SRS configuration information includes a Comb number information that is 4, the SRS is configured only in a part of physical resource blocks among all physical resource blocks in a bandwidth, wherein the part of physical resource blocks among all physical resource blocks in the bandwidth contains the SRS, the other physical resource blocks in the bandwidth do not contain the SRS, and a subcarrier frequency interval of the SRS in the bandwidth is determined according to the Comb number information,
    wherein the number of physical resource blocks carrying the SRS is an integer less than the total number of physical resource blocks in the bandwidth.

2. The method according to claim 1, wherein the method further comprises:
    transmitting, by the base station to the UE, UE-specific first signaling and/or cell-specific second signaling; wherein the first signaling contains SRS configuration information for the UE, and the second signaling contains SRS configuration information for a cell.

3. The method according to claim 1, wherein the SRS is transmitted in part or all of following resources:
    a last orthogonal frequency division multiplexing (OFDM) symbol of a subframe and a first or last OFDM symbol of a first slot of the subframe, or last two OFDM symbols of a subframe;
    or a last OFDM symbol of a subframe and one or more OFDM symbols transmitting a demodulation reference signal (DM-RS);
    or a last OFDM symbol of a subframe and one or more OFDM symbols transmitting a device to device (D2D) synchronization signal.

4. The method according to claim 3, wherein the OFDM symbols transmitting a DM-RS comprises:
    two OFDM symbols transmitting the DM-RS in the subframe in case of no data transmission, or an OFDM symbol transmitting the DM-RS in the subframe in case of low-speed transmission.

5. The method according to claim 3, wherein the OFDM symbols transmitting a D2D synchronization signal comprises:
    a second OFDM symbol and a third OFDM symbol of a first slot in a normal subframe, or a fifth OFDM symbol and a sixth OFDM symbol of a second slot in a normal subframe;
    or a first OFDM symbol and a second OFDM symbol of a first slot in an extended subframe, or a fourth OFDM symbol and a fifth OFDM symbol of a second slot in an extended subframe.

6. The method according to claim 1, wherein configuration information configured in the physical resource blocks is indicated by using high-layer signaling.

7. The method according to claim 1, wherein for a certain piece of UE, the SRS is configured at an interval of a predefined number of physical resource blocks.

8. The method according to claim 1, wherein a sampling rate of the SRS is 10 milliseconds or more.

9. The method according to claim 8, wherein the sampling rate of the SRS is 10 milliseconds, 20 milliseconds, 40 milliseconds, 80 milliseconds, 160 milliseconds, 320 milliseconds.

10. The method according to claim 1, wherein the method further comprises:
    transmitting, by the base station, third signaling for coordinating SRSs of different cells, so that in transmitting an SRS in a cell, other cells do not use resources to which the SRS corresponds, or use the resources at relatively low power.

11. The method according to claim 10, wherein the resources to which the SRS corresponds comprise one piece of the following information or a combination thereof: subframe information, OFDM symbol information, information on a number of combs, information on a frequency interval, information on physical resource blocks, power information, and information on cyclic offset of sounding reference signal sequences, used by the SRS.

12. The method according to claim 1, wherein the method further comprises:
receiving, by the base station, information on a number of antennas and/or information on an ability of a user reported by the UE, the information on an ability of a user being used to indicate whether the UE has an ability for transmission and reception by using an identical number of antennas.

13. The method according to claim 12, wherein the SRS is cycled by the UE in time domain resources and transmitted.

14. The method according to claim 12, wherein the method further comprises:
configuring the UE by the base station with two or more sets of the SRSs;
wherein resources transmitting the two or more sets of the SRSs are separated in the time domain, so that the UE transmit the two or more sets of the SRSs by using different antenna groups.

15. A downlink channel estimation apparatus based on a Sounding Reference Signal (SRS), comprising:
a transmitter configured to transmit to User Equipment (UE) a first signal including SRS configuration information; and
a receiver configured to receive the SRS transmitted by UE, wherein the SRS configuration information includes a Comb number information that is 4, the SRS is configured only in a part of physical resource blocks among all physical resource blocks in a bandwidth, wherein the part of physical resource blocks among all physical resource blocks in the bandwidth contains the SRS, the other physical resource blocks in the bandwidth do not contain the SRS, and a subcarrier frequency interval of the SRS in the bandwidth is determined according to the Comb number information,
wherein the number of physical resource blocks carrying the SRS is an integer less than the total number of physical resource blocks in the bandwidth.

16. The apparatus according to claim 15, wherein the apparatus further comprises:
a signaling transmitting unit configured to transmit UE-specific first signaling and/or cell-specific second signaling to the UE; wherein the first signaling contains SRS configuration information for the UE, and the second signaling contains SRS configuration information for a cell.

17. A communications system, comprising:
a base station configured to transmit to User Equipment (UE) a first signal including SRS (Sounding Reference Signal) configuration information, and to receive an SRS transmitted by the UE; and
the UE configured to receive from the base station the first signal, and to transmit the SRS to the base station, wherein the SRS is configured only in a part of physical resource blocks among all physical resource blocks in a bandwidth, wherein the part of physical resource blocks among all physical resource blocks in the bandwidth contains the SRS, the other physical resource blocks in the bandwidth do not contain the SRS, a subcarrier frequency interval of the SRS in the bandwidth is 4,
and the subcarrier frequency interval of the SRS in the bandwidth is determined according to a comb number,
wherein the number of physical resource blocks carrying the SRS is an integer less than the total number of physical resource blocks.

18. The method according to claim 1, wherein the method further comprises:
performing uplink channel estimation according to the SRS; and
acquiring downlink channel information according to uplink channel information obtained through the uplink channel estimation.

19. The apparatus according to claim 15, wherein the apparatus further comprises:
an uplink channel estimating unit configured to perform uplink channel estimation according to the SRS; and
a downlink channel information acquiring unit configured to acquire downlink channel information according to uplink channel information obtained through the uplink channel estimation.

20. The method according to claim 1, wherein configuration information configured in the physical resource blocks is predefined.

21. A terminal comprising:
a receiver configured to receive from a base station a first signal including Sounding Reference Signal (SRS) configuration information; and,
a transmitter configured to transmit to the base station a SRS according to the SRS configuration information,
wherein the SRS configuration information includes a comb number information, the comb number information indicates a comb number of 4, the SRS is configured only in a part of physical resource blocks among all physical resource blocks in a bandwidth, wherein the part of physical resource blocks among all physical resource blocks in the bandwidth contains the SRS, the other physical resource blocks in the bandwidth do not contain the SRS, and a subcarrier frequency interval of the SRS in the bandwidth is determined according to the comb number,
wherein the number of physical resource blocks carrying the SRS is an integer less than the total number of physical resource blocks.

* * * * *